United States Patent [19]

Symm et al.

[11] 4,056,510

[45] Nov. 1, 1977

[54] AMINE-MODIFIED POLYETHERS

[75] Inventors: Richard H. Symm; Byford D. Sheffield, both of Lake Jackson, Tex.

[73] Assignee: The Dow Chemical Company, Midland, Mich.

[21] Appl. No.: 543,219

[22] Filed: Jan. 23, 1975

[51] Int. Cl.² .................. C08G 65/24; C08G 65/26; C08G 65/32
[52] U.S. Cl. .................... 260/47 EP; 260/2 EP; 260/2 BP; 260/29.2 EP; 260/830 TW; 162/164 EP; 210/54
[58] Field of Search ............ 260/2 A, 2 BP, 830 TW, 260/823, 2 EP, 47 EP

[56] References Cited

U.S. PATENT DOCUMENTS

| | | | |
|---|---|---|---|
| 3,251,852 | 5/1966 | De Groote et al. | 260/309.6 |
| 3,305,565 | 2/1967 | Mueller | 260/348.6 |
| 3,544,655 | 12/1970 | Booth et al. | 260/830 |
| 3,746,678 | 7/1973 | Dick et al. | 260/2 A |
| 3,753,931 | 8/1973 | Raspanti | 260/2 BP |
| 3,790,524 | 2/1974 | Saito et al. | 260/45.8 N |
| 3,864,288 | 2/1975 | Riew et al. | 260/2 A |

*Primary Examiner*—Harold D. Anderson
*Assistant Examiner*—E. A. Nielsen
*Attorney, Agent, or Firm*—A. Cooper Ancona

[57] ABSTRACT

Water-soluble amine-modified polyethers are made by reacting an excess of alkylene polyamine such as ethylenediamine or diethylenetriamine with a halogen-containing polyether prepared by
reacting with a poly epoxide:
 a. a halogen-containing alkylene oxide monomer, or
 b. a mixture thereof with a non-halogen-containing alkylene oxide monomer, wherein said mixture contains at least about 50 mole percent of said halogen-containing monomer.

These amine modified polyethers may be additionally crosslinked by reacting with a difunctional compound, e.g. ethylene dichloride, to an extent which does not appreciably affect its solubility in water. The products are useful as drainage aids in paper pulp slurries and as flocculants.

12 Claims, No Drawings

AMINE-MODIFIED POLYETHERS

BACKGROUND OF THE INVENTION

This invention relates to a process for making water-soluble, partially crosslinked polyamine-polyalkylene oxide products and to the novel products of that process.

The copolymerization of epichlorohydrin with polyepoxides to produce polyalkylene oxide elastomers has been described by Booth et al. in U.S. Pat. No. 3,544,655. Lower molecular weight non-elastomeric products using a different catalyst system may be prepared by homopolymerization of epichlorohydrin followed by dehydrochlorination of terminal chlorohydrin groups to epoxides, and reaction of the epoxide groups with polyhydric compounds as described by Mueller in U.S. Pat. No. 3,305,565.

The reaction of polyepichlorohydrin and similar polyethers containing reactive halogen with alkylene polyamines such as diethylenetriamine and triethylenetetramine in the presence of a strong base is known. The products thereby obtained are only slightly soluble in water as described by DeGroote et al. in U.S. Pat. No. 3,251,852. More recently, water-soluble, lightly crosslinked polyether amines having useful properties as flocculants and drainage aids in paper manufacture have been prepared by reacting polyepichlorohydrin or other such polyethers with an excess of alkylenepolyamine and optionally reacting the product further with ethylene dichloride or other polyamine crosslinking agent. This process and its products are described by Dick et al., U.S. Pat. No. 3,746,678 and also by Raspanti, U.S. Pat. No. 3,753,931.

SUMMARY OF THE INVENTION

It has been found that modified polyether amines having improved properties as flocculants, paper pulp drainage aids, and other such applications are obtained by a process which comprises:

1. preparing an intermediate halogen-containing alkylene oxide polymer by reacting about 0.1–10 mole percent of a polyepoxide, such as the diglycidyl ether of bisphenol A, with an active halogen-containing lower alkylene oxide, e.g. epichlorohydrin, or a mixture thereof with less than 50 mole percent of a nonhalogen-containing lower alkylene oxide;
2. reacting said intermediate polymer with a polyamine selected from the group consisting of an alkylenediamine of 2–6 carbon atoms, a poly(lower alkylene) polyamine of 2–5 alkylene moieties, and mixtures thereof; wherein the proportion of said polyamine to said intermediate polymer is at least about 2 moles of polyamine per atom of chlorine in said intermediate polymer.

The above product may be additionally crosslined by reacting it with a crosslinking agent e.g., difunctional compound such as ethylene dichloride, to the extent wherein a significant increase in viscosity is obtained, but not to the extent wherein the crosslinked product becomes substantially or entirely insoluble in water.

DETAILED DESCRIPTION OF THE INVENTION

The halogenated alkylene oxide polymer may be prepared by polymerizing the alkylene oxide reactant with the polyepoxide. The process is carried out under the conditions conventionally used for making polyepihalohydrin. Thus, for example, the reaction may be carried out at moderate temperatures in the presence of a small amount of Lewis acid catalyst such as $BF_3$ or fluoboric acid, and using an inert reaction solvent such as methylene chloride or benzene. Preferably, about 1–5 mole percent of the polyepoxide is employed based on the total alkylene oxide reactant although as little as 0.1 or as much as 10 mole percent can be used. The polymer produced is a modified polyalkylene oxide with pendant halomethyl groups, their numbers being in proportion to the amount of halogenated alkylene oxide reactant used, with the essentially linear polyalkylene oxide chains being lightly crosslinked by bridging units. The polymer formed has a formula incorporating the following randomly recurring groups:

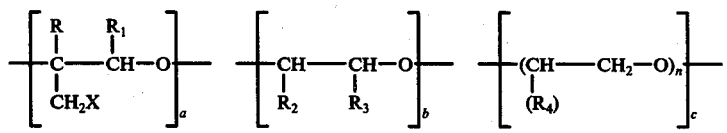

where X is a halogen atom, preferably chlorine, R and $R_1$ are independently H, lower alkyl and haloalkyl; $R_2$ and $R_3$ are independently H, lower alkyl, aryl, aralkyl, alkyl and aryl groups containing ether linkages, alkenyl, and alkenyloxy groups, alkyl and aryl groups containing substituents not reactive with amines; $R_4$ is a polyvalent group consisting of alkylene, arylene, aralkylene, cycloalkylene, alkylenoxy, arylenoxy and alkyl and aryl groups containing substituents not reactive with amines; n is the valence (functionality) of the $R_4$ group and is an integer of from 2 to 8; the molar ratio of $a$ to $b$ varies from 1/0 to 0.5/0.499 and the molar ratio of $a$ to $c$ varies from 0.999/0.001 to 0.5/0.1, and the sum of $a+b+c$ is equal to 1, the terminal groups are hydroxyl and the molecular weight varies from 2000 to 150,000.

Suitable halogenated alkylene oxide monomers are those having the formula

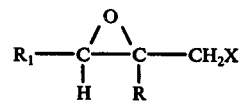

wherein R and $R_1$ are independently lower alkyl and haloalkyl. Examples of specific monomers are epichlorohydrin, 2-alkyl epichlorohydrin (such as 2-methyl epichlorohydrin) and 1,4-dichloro-2,3-epoxybutane. The preferred chlorinated alkylene oxide monomer is epichlorohydrin, or a mixture of epichlorohydrin with an equimolar amount of 2-alkyl epichlorohydrin and/or 1,4-dichloro-2,3-epoxybutane. The above monomers provide the group

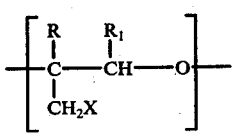

in the above-identified halogenated alkylene oxide polymer.

Suitable non-chlorinated epoxy monomers from which the

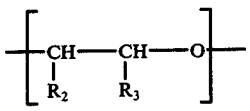

group is derived are:
1. the lower alkylene oxides such as ethylene oxide, propylene oxide, or butylene oxide,
2. the aryl oxides such as styrene oxide,
3. the alkyl glycidyl ethers such as butyl glycidyl ether, allyl glycidyl ether, or allyloxypropyl glycidyl ether, and
4. the aryl glycidyl ethers such as phenyl glycidyl ether and phenyloxypropyl glycidyl ether.

Suitable polyepoxide compounds from which the

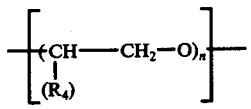

group is derived are any alkyl, cycloalkyl, alkaryl, dialkyl ether, or diaryl ether compound that contains at least 2 epoxide groups. Examples of suitable polyepoxides include vinylcyclohexene diepoxide, 3,4-epoxycyclohexylmethyl-3,4-epoxycyclohexane carboxylate, bis-(2,3-epoxycyclopentyl)ether, dicyclopentadiene diepoxide, resorcinol diglycidyl ether, glycerine diglycidyl ether, the polyglycidyl ether formed when an epihalohydrin and alkali are reacted with a polyhydric polyglycol, the diglycidyl ethers of bisphenols and bis-phenolepihalohydrin adducts which have the formula

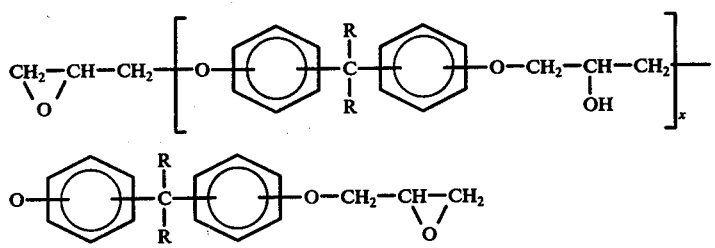

where $x = 0–20$ and R is an alkyl group containing 1–6 carbon atoms and those compounds containing multiple epoxide groups such as compounds of the formula

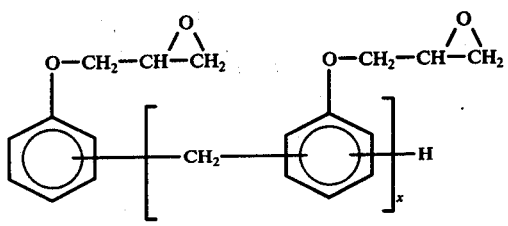

which are epoxylated novolac resins wherein $x$ has an average value of 1.02 to 7.

After evaporating or distilling the solvent from the reaction mixture, the residual product varies in consistency from a viscous liquid to a firm solid. This product is then reacted with polyamine under conditions essentially as described in prior art such as that cited above, e.g., using at least two moles, preferably 4–10 moles of polyalkylene polyamine per atom of reactive chlorine.

The polyamine reactant is preferably ethylenediamine, diethylenetriamine, triethylenetetramine, or 1,3-propanediamine. Other polyamines such as tetramethylenediamine, 1,6-diaminohexane, tetraethylenepentamine, pentaethylenehexamine, propylenediamine, butylenediamine, tripropylenetetramine, 3,3'-iminobis(-propylamine), piperazine, and other such polyamines are also operable in the process.

The use of a solvent in the polyamine reaction is optional. When the reactants are reasonably low viscosity liquids under the reaction conditions, no solvent is necessary. When one or both of the reactants is solid or extremely viscous, a solvent which is unreactive with both reactants and product is advantageous. Ethers such as tetrahydrofuran and dioxane and hydrocarbons such as octane, cyclohexane, benzene and xylene are examples of suitable solvents.

No acid acceptor other than the excess polyamine is required for the reaction.

The polyamine-halogenated polyether reaction can be carried out at any convenient temperature within the approximate range of 50°–175° C. Preferred reaction temperatures are in the range of 70°–150° C. and a convenient temperature is often the reflux temperature of the reaction mixture. Operation at atmospheric pressure is preferred but moderate pressure is sometimes more convenient. The reaction time is that required to react all or essentially all of the halogen atoms in the halogen-containing alkylene oxide polymers. This point is easily determined by analysis for ionic halide in the mixture. Reaction times of 0.5–20 hours are typical.

The products of this process are characterized by having pendant aminoalkylaminomethyl or amino(-polyalkylamino) methyl groups attached to the alkylene oxide polymer backbone with some of these polyamine groups attached at each end to two such backbones, thereby constituting crosslinking radicals in addition to those provided by the polyepoxide moieties. The original halomethyl groups in the starting halogenated alkylene oxide polymer reactant are essentially completely reacted with amino groups because of the substantial excess of polyamine reagent employed.

After the polyamine-halogenated polyether reaction is carried out, the excess polyamine is removed. This can be accomplished by first converting all the aminohydrohalides in the reaction mixture to free amines by addition of an acid binding agent, such as the sodium or potassium hydroxides or carbonates, in quantity sufficient to neutralize all of the halide ion content in the reaction mixture. The freed excess starting polyamine is then removed by distillation, preferably under vacuum. The resultant distillation residue is then dissolved in water for convenience in handling.

Although the products obtained from the polyaminehalogenated polyether reaction are active flocculants and useful paper pulp additives in themselves, even more active materials useful for the same purposes are made by crosslinking these products with conventional polyamine crosslinking agents to the point where there is a significant increase in viscosity without substantial loss of water solubility. For the preferred ethylene dichloride, the quantity of cross-linking agent required to accomplish this result is about 1–10 percent based on the weight of resin solids.

Crosslinking reactants useful in the present process include: alkylene dihalides such as ethylene dichloride, butylene dichloride, 1,6-dichlorohexane, 1,4-dichloro-2-butene, and the corresponding bromides and iodides; epihalohydrins such as epichlorohydrin, 1-chloro-2,3-epoxybutane, epibromohydrin, and the like; diepoxides such as 1,2,3,4-diepoxybutane, 1,2,5,6-diepoxyhexane; and other such compounds. Also included are the corresponding polyoxyalkylene compounds which can be derived from lower alkylene polyglycols. Illustrative of this class are diglycidyl ether, diethylene glycol dichloride (2,2'-dichlorodiethyl ether), the diglycidyl ether of dipropylene glycol, and the dichloride of polyethylene glycol of about 600 molecular weight.

The crosslinking reaction can be carried out generally under the same conditions used for the polyamine-chlorinated alkylene oxide polymer reaction.

The products of this process, whether crosslinked or not, range from viscous liquids to semi-solids resembling soft gels. Generally, they are yellowish to amber in color. They are soluble in water. When the products are very viscous or semi-solid their viscosity can be reduced considerably for convenience by subjecting them to shearing action such as provided by a high speed stirrer or mixer. The sheared products thereby obtained have considerably lower viscosities but with retained activity as flocculants, drainage aids, and the like.

These products are particularly useful as drainage aids for wood pulp slurries in papermaking. More generally, they are superior flocculants which are useful for treating sewage, water containing suspended mine tailings or slime, paper mill effluents, and the like. They are also useful pigment retention aids in paper manufacture.

EXAMPLE 1

Epichlorohydrin Polymer Preparation

A mixture of 2903 g. of methylene chloride and 14.4 g. 50% aqueous $HBF_4$ was made up in a reaction flask equipped with reflux condenser, heating and stirring means, and an addition funnel. This mixture was heated to 40° C. and about a tenth of a solution of 137.9 g. of the diglycidyl ether of Bisphenol A in 1343.4 g. of epichlorohydrin was added. The reaction mixture was stirred at 40° C. until heat of reaction began to develop, then addition of the diglycidyl ether solution was resumed at a rate sufficient to maintain the temperature of the reaction mixture at about 44° C. The total addition time was about 3 hours. Stirring was continued for about another hour, then the methylene chloride solvent was distilled off to leave a viscous, sticky liquid as the reaction product. This material had a weight average molecular weight of about 26,000.

Diamine Adduct

A portion of the above product (133.7 g., 1.3 gram atoms Cl) was warmed to above 50° C. and added over a 4 hour period to 565.1 g. (9.4 moles) of ethylenediamine at 87°–104° C. with stirring. The reaction mixture was stirred for another 1.5 hours at 102°–104° C, then it was cooled and transferred to a rotary vacuum evaporator whereby the excess ethylenediamine was removed at 60°–95° C. and vacuum to 3 mm Hg. The remaining reaction product was a very viscous yellow liquid, weight 268.4 g. This product contained 16.3% inorganic chloride as amine hydrochloride which was neutralized by adding 102.3 g. of 50% aqueous NaOH. The liberated ethylenediamine and water were removed as before to leave 237.9 g. of yellow sticky solid. Sufficient water was added to make a solution with total solids content of 27.2%. The solution contained 8.8% NaCl, indicating an active solids content of 18.4%. It had a pH of 11.3; the viscosity was 113 cps. at 25° C.

EXAMPLE 2

Cross-Linking a. A mixture of 152.5 g of the diamine adduct solution of Example 1 and 0.59 g (2.1% based on active solids) of ethylene dichloride was stirred and heated to 50° C for 1 hour. The temperature was then raised to 95° C. and after 7.5 hours at this temperature, the viscosity of the reaction solution had increased to 12,000 cps. at 25° C.

After cooling to room temperature, a portion of the solution was subjected to shearing agitation by a high speed stirrer which reduced its viscosity to 890 cps. at 25° C.

b. A second portion of the diamine adduct solution of Example 1 was reacted as above with 5.1% ethylene dichloride based on active solids. This cross-linked product solution had a final viscosity of 32,800 cps. at 25° C.

c. A third portion of the same diamine adduct solution was reacted with 2% ethylene dichloride as in (a) except that the dichloride was added in two equal portions with stirring for 4 hours after each addition and final digestion at 95° C. as before after all dichloride had been added. The final product solution has a viscosity of 4600 cps. at 25° C.

A portion of the cooled solution was subject to shearing agitation as in (a). The viscosity of the solution was reduced to 760 cps. by this treatment.

EXAMPLE 3

Evaluation As A Paper Pulp Drainage Aid

Unbleached sulfite wood pulp was refined to a Canadian Standard Freeness (CSF) of 210 mls. Diluted products of the above examples were added in the desired concentrations of pounds polymer per ton of pulp to 1 liter samples of pulp slurry containing 3.0 ± 0.1 g. of pulp solids. These samples had been adjusted to pH 4.5 or 7.5 with HCl or NaOH respectively prior to the addition of polymer. Each pulp slurry was stirred for 1 minute after addition of polymer and the CSF value was obtained according to TAPPI standard T-227 m-58.

The results of these measurements are listed in the following table. Results obtained with an untreated pulp slurry and one treated with a commercially used polyethylenimine additive (Tydex 12) are also included for purpose of comparison.

| Product | CSF, mls. | |
|---|---|---|
| | 2 lbs./ton, pH 4.5 | 4 lbs./ton, pH 7.5 |
| EDA adduct (Ex. 1) | 260 | 440 |
| 2.1% EDC cross-linked, Ex. 2(a), no shearing | 430 | 470 |
| Ex. 2(a) after shearing | 400 | 435 |
| 2.0% EDC cross-linked, two additions Ex. 2(c), no shearing | 410 | 530 |
| Ex. 2(c) after shearing | 415 | 425 |
| 5.1% EDC cross-linked Ex. 2(b), no shearing | 470 | 505 |
| Untreated pulp slurry | 210 | 210 |
| Tydex 12 PEI | 280 | 380 |

We claim:

1. A water-soluble amine-modified polyether made by reacting an excess of an alkylene polyamine with a halogen-containing polyether prepared by
   reacting with 0.1 to 10 mole percent of a poly-1,2-epoxide:
   a. a halogen-containing alkylene oxide monomer, or
   b. a mixture thereof with a non-halogen-containing alkylene oxide monomer, wherein said mixture contains at least about 50 mole percent of said halogen-containing monomer.

2. The product of claim 1 wherein the halogen-containing alkylene oxide monomer is epichlorohydrin.

3. The product of claim 1 wherein the alkylene polyamine is ethylenediamine.

4. The product of claim 2 wherein the non-halogen-containing alkylene oxide monomer is ethylene oxide.

5. The product of claim 1 wherein the polyepoxide is an aryl glycidyl ether.

6. The product of claim 5 wherein the aryl glycidyl ether is the diglycidyl ether of bisphenol A.

7. A water-soluble amine-modified polyether made by reacting an excess of ethylene diamine with a halogen containing polyether prepared by reacting epichlorohydrin with 0.1 to 10 mole percent of the diglycidyl ether of bisphenol A.

8. The product of claim 7 wherein there is employed at least 2 moles of ethylene diamine per atom of chlorine.

9. The product of claim 8 which has been additionally crosslinked by reacting it with a difunctional crosslinking agent in sufficient amount to obtain a significant increase in viscosity but not sufficient to obtain substantial insolubility in water.

10. The product of claim 9 wherein the difunctional crosslinking agent is ethylene dichloride.

11. The product of claim 9 wherein the difunctional crosslinking agent is a diepoxide.

12. The product of claim 11 wherein the diepoxide is the diglycidyl ether of bisphenol A.

* * * * *